United States Patent [19]

Meier et al.

[11] 4,117,739

[45] Oct. 3, 1978

[54] GEAR DRIVES WITH DIRECTION OF ROTATION REVERSAL

[75] Inventors: Heinz Meier; Egon Zurawski, both of Berlin; Paul Greppmaier, Nuremberg, all of Fed. Rep. of Germany

[73] Assignee: Triumph Werke Nurnberg A.G., Nuremberg, Fed. Rep. of Germany

[21] Appl. No.: 841,653

[22] Filed: Oct. 13, 1977

[30] Foreign Application Priority Data

Oct. 28, 1976 [DE] Fed. Rep. of Germany ....... 2648911

[51] Int. Cl.² ................... F16H 57/00; F16H 55/04
[52] U.S. Cl. ........................................ 74/404; 74/435
[58] Field of Search ................ 74/404, 435, 411.5, 74/436

[56] References Cited

U.S. PATENT DOCUMENTS

| | | | |
|---|---|---|---|
| 2,040,933 | 5/1936 | Gillen | 74/435 |
| 3,442,146 | 5/1969 | Simpson | 74/435 |
| 4,065,980 | 1/1978 | Ichinose | 74/404 |

*Primary Examiner*—Leonard H. Gerin
*Attorney, Agent, or Firm*—Brian L. Ribando

[57] ABSTRACT

A uni-directionally rotated clutched driving gear having arcuate segments of gear teeth acts sequentially on two idler gears to effect a two-speed bi-directional rotation of a driven gear. The driven gear may be attached to the drive shaft of the character wheels in a recording calculator.

11 Claims, 3 Drawing Figures

U.S. Patent     Oct. 3, 1978     4,117,739
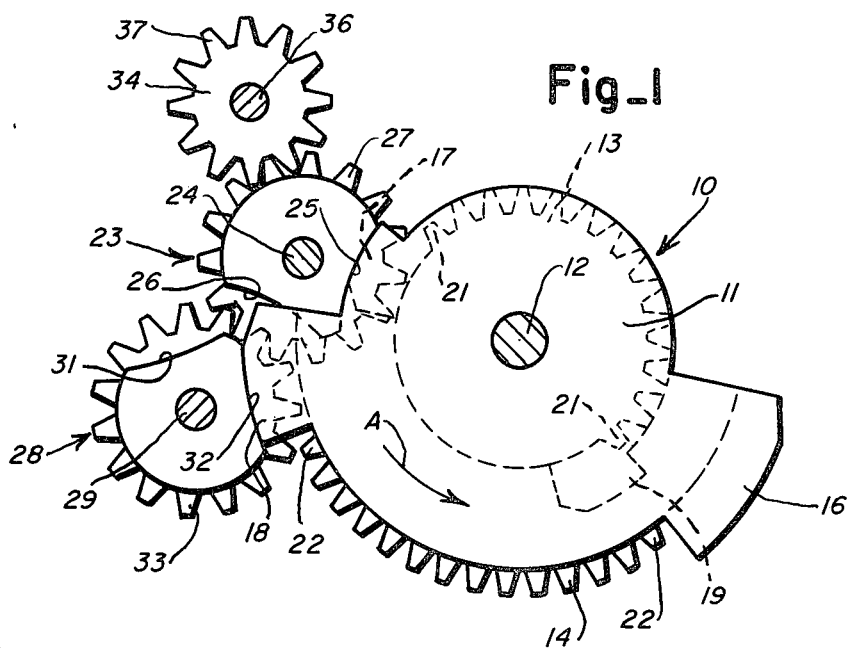
Fig_1
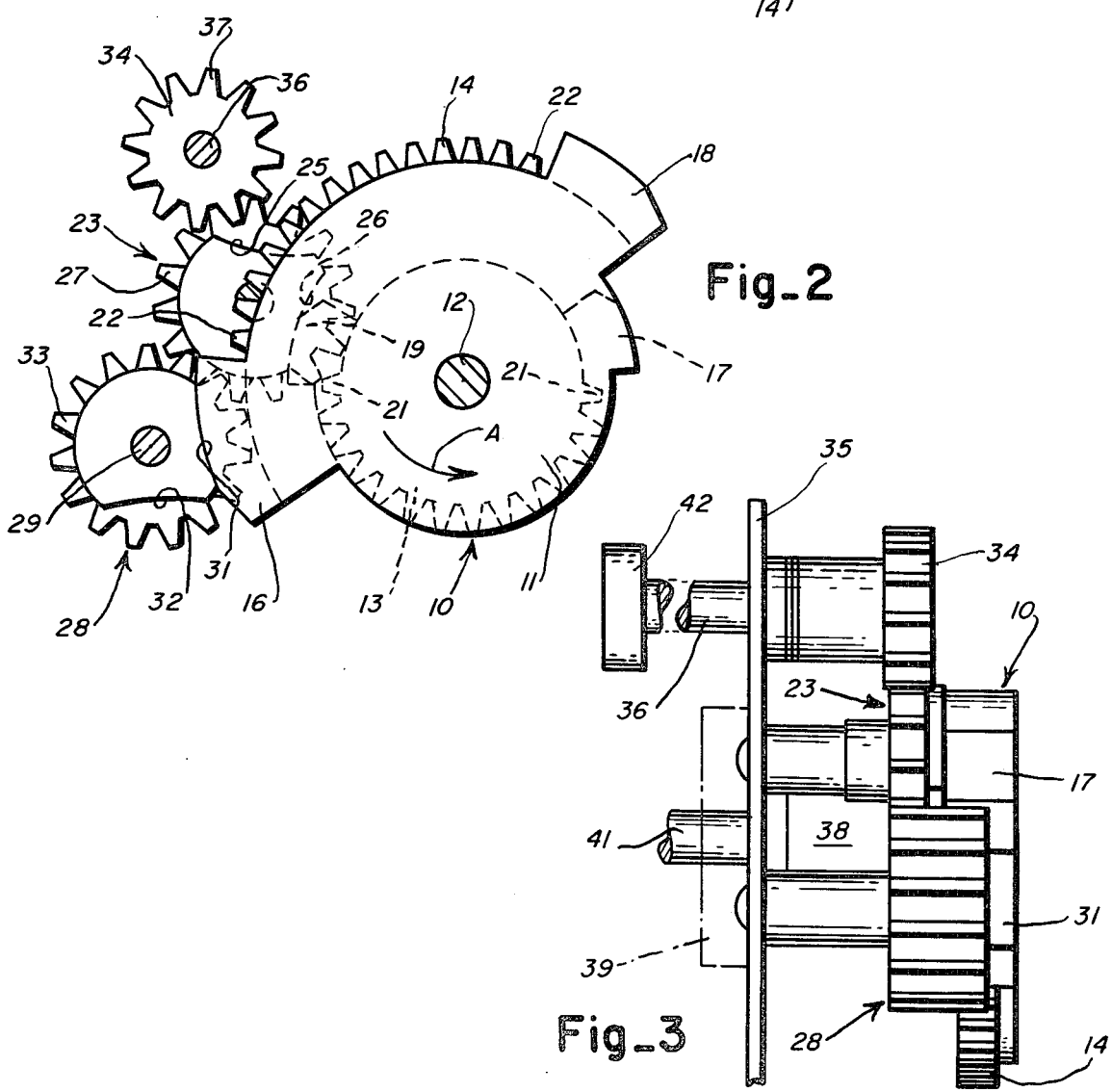
Fig_2
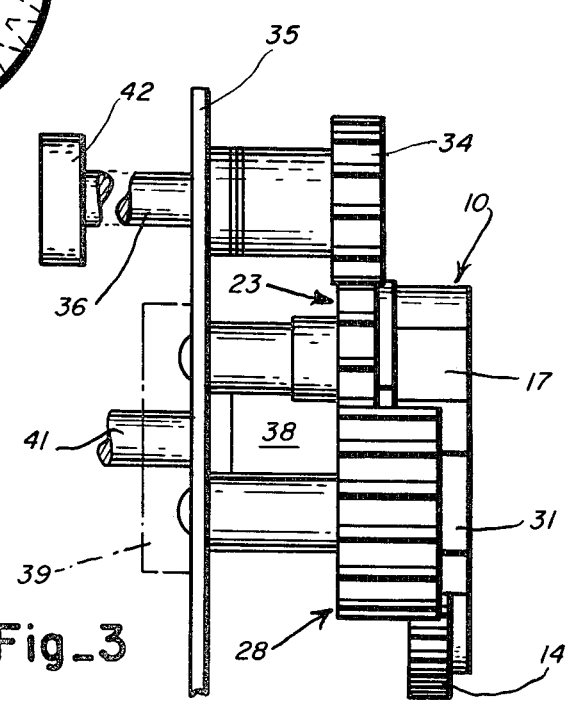
Fig_3

GEAR DRIVES WITH DIRECTION OF ROTATION REVERSAL

BACKGROUND OF THE INVENTION

The invention relates to a drive mechanism for the character wheels in a recording calculator, and more particularly to a gear drive mechanism in which a one-way rotation of drive gear is translated in turn to two idler gears to impart a bi-directional two-speed rotation to a driven gear.

Gear drives which are used to rotate the character wheels in a recording calculator are known in the prior art. Such drives must be capable of setting the character wheels to a print position, then of holding the character wheels in the print position while printing is effected, and lastly of resetting the character wheels to a rest or home position in readiness for the next printing operation. One arrangement for rotating character wheels is shown by German Pat. No. 1,122,304. In this patent, a reversal of the direction of rotation of a driven shaft is accomplished by a mechanism in which a cam controlled lever engages, by means of a gear segment, a gear which is located on a shaft which is to be driven. A reversal of rotation of a character wheel is effected by the action of a cam control on the gear segment. While this mechanism produces the character wheel motion which is desired, there are several disadvantages. Special means must be provided to maintain the shaft in a set position during the printing operation. Because the control lever experiences long travel distances during operation, considerable space is required. Also, the cam plate and the radius of action of the cam plate are design factors which prevent the utilization of small printing units. The cam plate when moving in one direction must counteract a return spring, and this counteraction results in a favoring of motion in one direction over motion in the opposite direction. This directional motion favoring results in differing ratios of forces which become more imbalanced when it is desired to have the velocity of motion in one direction be greater than the velocity of motion in the opposite direction.

SUMMARY OF THE INVENTION

In accordance with the present invention, a bi-directional two-speed gear drive is provided for a drive shaft along which are located a plurality of character wheels. A clutched drive wheel is formed with two arcuate segments of gear teeth. Also formed on the drive wheel are arcuate locking segments. The gear segments sequentially mesh with each of two idler gears. The locking segments of the drive gear intermittently cooperate with locking surfaces formed on the idler gears, which cooperation results in the locking of the idler gears to prevent the rotation thereof. One of the idler gears drives a driven gear to which is attached the drive shaft of a plurality of character wheels. When the drive gear is meshed with one of the two idler gears, the rotation of the driven gear is in one direction. When the driving gear meshes with the other of the two idler gears, the rotation of the driven gear is in the opposite direction. The positioning of the arcuate locking segments on the drive gear with respect to the arcuate segments of gear teeth is such that the character wheels are locked against rotation both when in a rest position and when in a printing position.

OBJECTS OF THE INVENTION

It is, therefore, an object of the invention to provide a uni-directionally rotated drive gear which acts to produce a two-speed bi-directional rotation of a driven gear.

It is another object of the invention to provide a uni-directionally rotated clutched driving gear having a plurality of arcuate segments of driving gear teeth which act sequentially on two idler gears to drive a driven gear bi-directionally and at two speeds.

It is a further object of the invention to provide a uni-directionally rotated clutched driving gear having a plurality of arcuate segments of driving gear teeth and a plurality of arcuate locking segments wherein the driving gear acts to sequentially drive two idler gears and a driven gear bi-directionally and at two speeds and to lock against rotation the two idler gears and the driven gear.

These and other objects of the invention will become apparent from the following detailed description taken in connection with the accompanying drawing in which like reference numerals designate like or corresponding parts throughout the figures thereof.

BRIEF DESCRIPTION OF THE DRAWING

FIG. 1 is a side view of a gear drive mechanism in a first locked orientation;

FIG. 2 is a side view of a gear drive mechanism in a second locked orientation; and FIG. 3 is a front view of a gear drive mechanism in first locked orientation showing the mounting of the various gears thereof on a wall member.

DESCRIPTION OF THE PREFERRED EMBODIMENT

Referring first to FIG. 1, there is shown a gear drive mechanism generally designated by reference numeral 10. The drive mechanism includes a driving gear 11 which is mounted on a shaft 12. The driving gear 11 includes an arcuate segment of gear teeth 13 and an oppositely oriented axially displaced arcuate segment of gear teeth 14. It will be noted that the gear segment 13 is located a different radial distance from the shaft 12 than is the gear segment 14. Also formed on the gear 11 are two pairs of arcuate convex locking segments 16, 18 and 17, 19 associated respectively with gear segments 14 and 13. It will be noted that the end teeth 21 of the arcuate gear segment 13 are slightly shorter than the remaining teeth in the segment 13 and that the end teeth 22 of the arcuate gear segment 14 are also slightly shorter than the remaining teeth in the segment 14.

A first idler gear generally designated by reference numeral 23 is mounted on a shaft 24. The idler gear 23 includes a concave locking surface 25, which locking surface in the rest position shown in FIG. 1, is in engagement with the convex locking segment 17 of the gear 11. The gear 23 includes a second concave locking surface 26 and a plurality of gear teeth 27. A second idler gear generally designated by reference numeral 28 is mounted on a shaft 29. The second idler gear 28 includes concave locking surfaces 31 and 32. The concave surface 32 in the rest position shown in FIG. 1 is in locking engagement with the convex locking segment 18 of gear 11. The gear 28 includes gear teeth 33. A driven gear 34 is mounted on a shaft 36, and the driven gear 34 includes gear teeth 37. The gear teeth 37 mesh with the teeth 27 of the first idler gear 23.

As shown in the configuration of FIG. 1, the locking segments 17 and 18 of the driving gear 11 prevent the rotation of either of the idler gears 23 and 28. This locks the driven gear 34 against any rotation. Rotation of the driving gear 11 in a counterclockwise direction as indicated by the arrow A brings the arcuate segment of gear teeth 13 into a driving engagement with the gear teeth 27 of the idler gear 23. At the same time, the locking segments 17 and 18 are rotated out of locking engagement with the locking surfaces 25 and 32 of the first and second idler gears 23 and 28, respectively. Further counterclockwise rotation of the driving gear 11 drives the idler gear 23 in a clockwise direction which drives the driven gear 34 in a counterclockwise character positioning direction. At this time, idler gear 28 is driven in a counterclockwise direction to no effect.

Turning now to FIG. 2, an understanding of the effects of the continued rotation of the drive gear 11 can be understood. As shown, the drive gear 11 has been rotated counterclockwise to a position in which the convex locking segment 16 of the gear 11 is in engagement with the locking surface 31 of the second idler gear 28. It will be seen that the arcuate gear segment 13 is no longer in driving engagement with the gear teeth 27 of the first idler gear 23 and that the locking segment 19 of the gear 11 is in engagement with the locking surface 26 of the first idler gear 23. Although gear 11 continues to rotate, the driven gear 34 remains locked against rotation to hold character wheels in a print position over a given interval. Continued counterclockwise rotation of the drive gear 11 brings the gear segment 14 into engagement with the teeth 33 of the second idler gear 28. Further counterclockwise rotation of the drive gear 11 results in a clockwise rotation of the second idler gear 28. The second idler gear 28 now drives the first idler gear 23 in a counterclockwise direction, and the driven gear 34 is driven in a clockwise return direction thereby. It will be appreciated that since the teeth of the arcuate gear segment 14 on the driving gear 11 are traveling at a greater peripheral speed than the gear teeth of the arcuate gear segment 13, the idler gears 28 and 23 and the driven gear 34 are driven at a greater speed by the gear segment 14 than the idler gear 23 and the driven gear 34 are driven by the gear segment 13. Continued counterclockwise rotation of the drive gear 11 brings the locking segment 17 into a locking engagement with the locking surface 25 of the first idler gear 23 and the locking segment 18 into a locking engagement with the locking surface 32 of the second idler gear 28.

Turning now to FIG. 3, it will be seen that the various gears are mounted on a planar support 35. This support may comprise a frame wall of the recording calculator or the like. The hub 38 of the drive gear 11 is driven through a single revolution clutch 39, shown diagrammatically only. The clutch 39 is driven by a shaft 41. Attached to the shaft 36, shown broken, is a character wheel 42 which is the first of a series of character wheels.

The operation of the device will be apparent to those skilled in the art. Through the action of the single revolution clutch 39, the drive gear 11 is rotated through an angle of 360°. At the start of a revolution of the drive gear 11, the idler gears 23 and 28 are initially locked against rotation. The meshing of the idler gear 23 with the driven gear 34 results in the driven gear also being locked against rotation. As the drive gear rotates, the locking engagement is released, and the idler gear 23 is driven by the driving gear segment 13. After a predetermined angle of rotation has been effected, the locking segments 16 and 19 on the driving gear 11 lock with the locking surfaces 26 and 31 on the idler gears 23 and 28, respectively. This locking prevents the rotation of the idler gears 23 and 28 and of the driven gear 34. In this locked position, printing may be effected by suitable means, not shown, which cooperate with the character wheels which have been rotated to a desired position. Further rotation of the drive gear 11 causes the gear segment 14 to drive the second idler gear 28. The gear 28 in turn drives the first idler gear 23 and the driven gear 34. This rotation of the gear 34 resets the character wheel to a rest or home position. Through the utilization of the differing gear radii employed by the driving gear segments 13 and 14, the speed of rotation of the idler and the driven gear is different in the directions of rotation which are effected. The shortened teeth 21 and 22 on both ends of each of the gear segments 13 and 14 allow the segments 13 and 14 to mesh and to be retracted from the teeth of the gears 23 and 28, respectively, while the said gears are held in a locked position under the action of the locking segments. It will be appreciated that various materials such as metal or plastic may be suitably employed for the formation of the gear wheels of the device.

Various modifications will occur to those skilled in the art. For example, where it is not necessary that the driven gear rotate at a greater speed to the home position than to the set position, the segments of the gear teeth on the driving gear may be located at equal radial distances from the center of rotation of the driving gear. Also, locking surfaces need be formed only on the driving gear and on the first idler gear without precluding the desired result of locking the idler and the driven gears in certain positions. The driven gear may be directly meshed with the second idler gear rather than with the first. The use of a separate driven gear is not essential. For example, a driven shaft on which character wheels are mounted may be the same shaft on which one of the two idler gears are mounted. Using such a construction, a two-speed bi-directional rotation of the driven shaft is realizable from a uni-directional rotation of a driving gear.

We claim:

1. A gear mechanism for use in rotating a character wheel, the mechanism comprising:
    a rotatable driving gear having at least one segment of gear teeth,
    a first idler gear having gear teeth which are engagable with said driving gear,
    a second idler gear having gear teeth which are engagable with said driving gear,
    a driven gear having gear teeth in engagement with at least one of said idler gears, said mechanism causing the driven gear to be sequentially rotated in two directions in response to the driving gear rotating in one direction.

2. The gear mechanism of claim 1:
    said driving gear having at least two segments of gear teeth, said two segments being disposed at first and second differing diameters from the center of rotation of said driving gear.

3. The gear mechanism of claim 1:
    said driving gear having at least one arcuate locking segment, and
    said first idler gear having at least one locking surface, said first idler gear being lockable against rotation by a cooperation between said locking segment and said locking surface.

4. The gear mechanism of claim 2:
said driving gear having at least one arcuate locking segment, and
said first idler gear having at least one locking surface, said first idler gear being lockable against rotation by a cooperation between said locking segment and said locking surface.

5. The gear mechanism of claim 3:
said second idler gear having at least one locking surface, and
said driving gear having a second arcuate locking segment, said second idler gear being lockable against rotation by cooperation between said second arcuate locking segment and the locking surface of said second idler gear.

6. A gear mechanism for use in rotating a character wheel, the gear mechanism comprising:
a rotatable driving gear having two arcuate segments of gear teeth and at least two arcuate locking segments,
a first rotatable idler gear having gear teeth and at least one locking surface,
a second rotatable idler gear having gear teeth in engagement with the teeth of the first idler gear and having at least one locking surface, and
a driven gear having gear teeth in engagement with one of said idler gears.

7. The gear mechanism of claim 6:
a first arcuate segment of driving gear teeth located on a first radius and engagable with said first idler gear,
a second arcuate segment of driving gear teeth located on a second radius and engagable with said second idler gear,
the first and second arcuate segments of driving gear teeth being located on said driving gear to drive said driven gear first in one direction at one speed and thereafter in the opposite direction at a second speed.

8. The gear mechanism of claim 7:
first and second arcuate locking segments located on either side of the first arcuate segment of driving gear teeth, and
third and fourth arcuate locking segments located on either side of the second arcuate segment of driving gear teeth.

9. The gear mechanism of claim 8:
the first and last gear of the first arcuate segment of driving gear teeth being shorter than the remaining teeth of the segment, and
the first and last gear teeth of the second arcuate segment of driving gear teeth being shorter than the remaining teeth of the segment.

10. A gear mechanism for use in rotating a character wheel, the gear mechanism comprising:
a rotatable driving gear having arcuate segments of gear teeth and at least two arcuate locking segments,
a first rotatable idler gear having gear teeth and at least one locking surface,
a second rotatable idler gear having gear teeth in engagement with the teeth of the first idler gear and having at least one locking surface, and
a shaft which is driven by one of said two idler gears.

11. The gear mechanism of claim 10:
a first arcuate segment of driving gear teeth located on a first radius and engagable with said first idler gear,
a second arcuate segment of driving gear teeth located on a second radius and engagable with said second idler gear,
the first and second arcuate segments of driving gear teeth being located on said driving gear to drive said driven shaft first in one direction at one speed and thereafter in the opposite direction at a second speed.

* * * * *